Patented Jan. 1, 1935

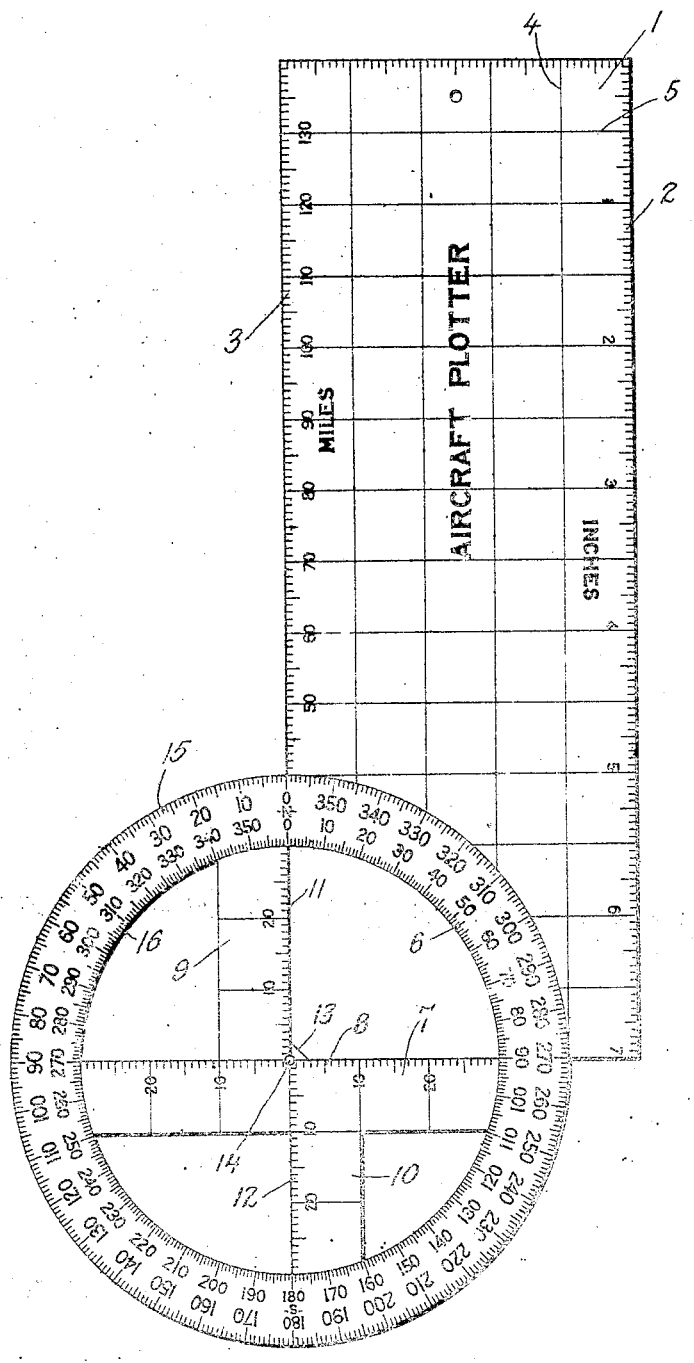

1,985,907

UNITED STATES PATENT OFFICE 1,985,907

NAVIGATIONAL INSTRUMENT

Philip Van Horn Weems, United States Navy

Application March 22, 1933, Serial No. 662,112

3 Claims. (Cl. 33—1)

(Granted under the act of March 3, 1883, as amended April 30, 1928; 370 O. G. 757)

This invention relates to a plotting instrument for use in navigation and more particularly in aerial navigation.

It is the object of this invention to provide a device of the type mentioned that is light, of convenient size and applicable to the solution of a large number of navigational problems.

With the above and other objects in view, the invention consists in the construction, combination and arrangement of parts as will be hereinafter more fully described.

The drawing shows the form of the invention that is at present preferred.

The subject device is preferably made of transparent celluloid or the like and comprises a blade 1 having one longitudinal edge calibrated with a scale 2 in inches and its opposite longitudinal edge with a scale 3 representing miles, in which the unit as shown is 20 miles to the inch. A series of parallel longitudinal lines 4 and a series of parallel transverse lines 5 form a grid for drawing parallel lines.

An annular protractor 6 is set into one corner of the blade with a member 7 extending transversely thereof and having an edge 8 disposed on a diameter of the protractor and also aligned with the adjacent transverse edge of blade 1. Members 9 and 10 extend from opposite sides of the member 7 to the protractor 6, the last mentioned two members having edges 11 and 12, respectively, lying on a diameter of the protractor and in alignment with the adjacent longitudinal edge of blade 1. A fillet 13 is formed between edges 11 and 7 to permit forming a hole 14 at the center of the protractor, through which a pencil may be inserted to serve as a pivot about which the instrument may be rotated. Edges 11 and 12 are calibrated in the same units as scale 3 and form a part thereof, the zero point of the scale lying at the center of the protractor. Likewise the edge 8 is calibrated in the units of scale 3 from the center of the protractor as a zero point. The protractor has on it two angle scales 15 and 16 with the numerals of the two scales running in opposite directions from the zero point on a line with that edge of blade 1 that carries scale 3 whereby angles in either direction from the zero point may be read directly. The sets of lines 4 and 5 are provided to adapt the instrument for drawing parallel lines on a chart.

Scale 3, which is 20 miles to the inch, is the same as that of the universal plotting sheet and also the same as that of the aircraft Mercator plotting sheets. With the center of the protractor disposed at a desired point on the chart, the instrument can be rotated about that center and bearings and distances will be shown directly, or with the zero of the scale on the north-south line the protractor can be used to mark bearings.

It will be understood that the above description and accompanying drawing comprehend only the general and preferred embodiment of my invention and that various changes in construction, proportion and arrangement of parts may be made within the scope of the appended claims without sacrificing any of the advantages of my invention.

The invention described herein may be manufactured and used by or for the Government of the United States of America for governmental purposes without the payment of any royalties thereon or therefor.

I claim:

1. In a navigational instrument, a blade having its longitudinal edges calibrated in units of distance, the calibrations on one edge being of different magnitude from those on the other, said blade having on it two sets of parallel lines forming a rectangular grid, an annular protractor set into one corner of said blade, a member extending across said protractor having one edge on a diametral line of said protractor and aligned with an end of said blade, a second member extending from said first member to the protractor and having an edge aligned with a lateral edge of said blade, and a third member extending from the opposite side of the first member to the protractor and having an edge aligned with said lateral edge, the said aligned edges of the second and third members lying on opposite sides of the diameter in line with said lateral edge of the blade, the diametral edges of said three members being calibrated in the same units as that edge of the blade with which the second and third members are aligned and there being a small aperture defined at the center of said protractor.

2. In a navigational instrument, a blade having its longitudinal edges calibrated in units of distance, the calibrations on one edge being of different magnitude from those on the other, said blade having on it two sets of parallel lines forming a rectangular grid, an annular protractor set into one corner of said blade and integrally united with said blade, a member extending across said protractor having one edge on a diametral line of said protractor and aligned with an end of said blade to constitute a continuation of said edge and other members connecting opposite sides of the first member to the protractor, each of said other members having a calibrated edge lying on a diameter and in alignment with a lateral edge of said blade and forming a continuation of the scale on said lateral edge.

3. In a navigational instrument, a blade, a scale on a lateral edge thereof, a protractor set into a corner of said blade adjacent said edge with its center aligned with said edge and integrally united with said blade, a member extending across said protractor having an edge aligned with an end of said blade and lying on a diameter of the protractor to form a continuation of said end, said edge being calibrated in the same units as the aforesaid edge and other members connecting opposite sides of said member to the protractor, each of the last mentioned members having a calibrated edge forming a prolongation of the calibration on said edge of the blade, there being an aperture formed in two of said members at the center of the protractor.

PHILIP VAN HORN WEEMS.